United States Patent
Guven et al.

(10) Patent No.: US 10,355,581 B2
(45) Date of Patent: Jul. 16, 2019

(54) FAULT TOLERANT INVERTER OR CONTROLLED RECTIFIER SYSTEM

(71) Applicant: SCHLUMBERGER TECHNOLOGY CORPORATION, Sugar Land, TX (US)

(72) Inventors: Mustafa Kamil Guven, Katy, TX (US); Yaoxin Qian, Missouri City, TX (US); In Chul Jang, Sugar Land, TX (US); John Parry, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/762,430

(22) PCT Filed: Sep. 21, 2016

(86) PCT No.: PCT/US2016/052730
§ 371 (c)(1),
(2) Date: Mar. 22, 2018

(87) PCT Pub. No.: WO2017/053331
PCT Pub. Date: Mar. 30, 2017

(65) Prior Publication Data
US 2018/0278146 A1    Sep. 27, 2018

Related U.S. Application Data

(60) Provisional application No. 62/221,716, filed on Sep. 22, 2016.

(51) Int. Cl.
*E21B 4/02* (2006.01)
*E21B 4/04* (2006.01)
(Continued)

(52) U.S. Cl.
CPC .............. *H02M 1/32* (2013.01); *E21B 4/02* (2013.01); *E21B 4/04* (2013.01); *E21B 41/0085* (2013.01);
(Continued)

(58) Field of Classification Search
CPC ...... H02P 1/00; H02P 1/04; H02P 1/10; H02P 1/24; H02P 1/26; H02P 1/42; H02P 1/46;
(Continued)

(56) References Cited

U.S. PATENT DOCUMENTS

| 5,872,707 A | 2/1999 | Asplund |
| 5,945,802 A * | 8/1999 | Konrad ............... F04D 15/0066 318/490 |

(Continued)

OTHER PUBLICATIONS

Examination and Search Report for European Application Serial No. 16849447.4, dated Apr. 4, 2019, 8 pages.

*Primary Examiner* — Antony M Paul (57) ABSTRACT

A fault tolerant inverter or controlled rectifier system includes a first leg having at least one switch device, a spare leg having at least one spare switch device, a spare leg connect switch associated with the spare leg and the first leg, a fault detection sub-system for detecting a fault in the first leg and outputting a signal on detection of a fault in the first leg, and a leg selection control sub-system that receives the signal output by the fault detection sub-system and controls the operation of the spare leg connect switch in accordance with the output signal, such that on detection of a fault the spare leg may be activated to take over the operation of the first leg.

15 Claims, 4 Drawing Sheets

(51) Int. Cl.

| | | |
|---|---|---|
| *H02M 1/32* | (2007.01) | |
| *H02P 27/04* | (2016.01) | |
| *H02P 27/06* | (2006.01) | |
| *H02P 29/028* | (2016.01) | |
| *E21B 41/00* | (2006.01) | |
| *H02M 7/5387* | (2007.01) | |
| *E21B 7/04* | (2006.01) | |
| *H02M 7/797* | (2006.01) | |

(52) U.S. Cl.
CPC ........ *H02M 7/5387* (2013.01); *H02P 29/028* (2013.01); *E21B 7/04* (2013.01); *H02M 7/797* (2013.01); *H02M 2001/325* (2013.01); *H02P 27/04* (2013.01); *H02P 27/06* (2013.01)

(58) Field of Classification Search
CPC .... H02P 1/426; H02P 3/00; H02P 3/12; H02P 3/22; H02P 5/486; H02P 6/00; H02P 6/12; H02P 6/14; H02P 6/24; H02P 7/20; H02P 27/04; H02P 27/06; H02P 23/00; H02P 27/00; H02P 29/028; H02M 1/32; E21B 4/02; E21B 41/0085; G05B 9/02
USPC ............ 318/400.01, 400.02, 400.14, 400.26, 318/400.27, 400.28, 700, 701, 727, 779, 318/799, 800, 801, 430, 563; 701/39, 43, 701/62, 92, 97, 107; 361/23, 30
See application file for complete search history.

(56) References Cited

U.S. PATENT DOCUMENTS

| | | | |
|---|---|---|---|
| 8,604,733 B2 * | 12/2013 | Liegeois | ................ H02M 7/49 318/400.01 |
| 2004/0125523 A1 | 7/2004 | Edwards et al. | |
| 2008/0054726 A1 | 3/2008 | Chang et al. | |
| 2009/0021393 A1 | 1/2009 | Layton et al. | |
| 2013/0181553 A1 | 7/2013 | Wu et al. | |
| 2013/0245614 A1 | 9/2013 | Seebruch | |

* cited by examiner

FAULT TOLERANT INVERTER OR CONTROLLED RECTIFIER SYSTEM

CROSS-REFERENCE TO RELATED APPLICATIONS

This application claims priority to and the benefit of U.S. Provisional Application No. 62/221,716, filed Sep. 22, 2015, the entire disclosure of which is hereby incorporated herein by reference.

BACKGROUND

Embodiments of the present disclosure relate in general to a fault tolerant inverter and/or controlled rectifier topologies.

Inverters are commonly used to drive induction motors. In many modern applications, such motors can also act as generators, with the inverter configured to act as a controlled bridge rectifier.

As will be appreciated, a typical inverter includes a number of switch devices which are often transistor based switch devices (such as insulated-gate bipolar transistors). The failure of one or more of the switch devices will disrupt the operation of the inverter and, depending on the application, may mean that the motor can no longer be operated until the inverter is repaired.

In some applications the repair of the inverter is difficult or impossible. Indeed, in some applications, the downtime cost due to the length of time and process required to repair the inverter can be considerably more than the cost of the failed switch device.

Accordingly, embodiments of the present disclosure seek to alleviate one or more problems associated with the prior art.

BRIEF SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set.

An aspect of embodiments of the present disclosure provides a fault tolerant inverter or controlled rectifier system comprising a first leg that includes at least one switch device, a spare leg that includes at least one spare switch device, a spare leg connect switch associated with the spare leg and the first leg, a fault detection sub-system to detect a fault in the first leg and to output a signal on detection of a fault in the first leg, and a leg selection control sub-system to receive the signal output by the fault detection sub-system and control the operation of the spare leg connect switch in accordance with the signal output by the fault detection sub-system, such that on detection of a fault the spare leg may be activated to take over the operation of the first leg.

The system may further comprise a leg disconnect switch associated with the first leg and configured to deactivate the first leg on detection of a fault.

The system may further comprise a control system configured to control the operation of the at least one switch device and the at least one spare switch device, wherein the control system is configured to control the at least one spare switch device to take over operation of the at least one switch device in the event of a fault.

The control system may be configured to receive the signal output by the fault detection sub-system.

The control system may be configured to receive a further signal output by the leg selection control sub-system in response to receipt of the signal from the fault detection sub-system.

The system may further comprise a control system configured to control the operation of the at least one switch device, wherein the control system is configured to deactivate the first leg on detection of a fault.

The first leg may include at least three switch devices.

The control system may be configured to receive the signal output by the fault detection sub-system.

The control system may be configured to receive a further signal output by the leg selection control sub-system in response to receipt of the signal from the fault detection sub-system.

The first leg may be one of a plurality of legs, each leg including at least one switch device, the fault detection sub-system may be further configured to detect a fault in any of the plurality legs and the signal output by the fault detection sub-system may include an indication of the leg in which the fault occurred, each of the plurality of legs may be associated with a respective spare leg connect switch, and the leg selection control sub-system may be configured to receive the signal output by the fault detection sub-system and to control the operation of the spare leg connect switch associated with the leg in which the fault was detected to activate the spare leg to take over the operation of the leg in which the fault was detected.

The system may be a multilevel inverter or controlled rectifier system.

Another aspect provides a drive or drive-generation system including: an inverter or controlled rectifier system as above; and a motor or motor-generator connected to the inverter or controller rectifier system.

The motor or motor-generator may include a three phase motor.

Another aspect provides downhole equipment including a system as above.

The downhole equipment may be configured to operate down a borehole.

BRIEF DESCRIPTION OF THE DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Figure 1:
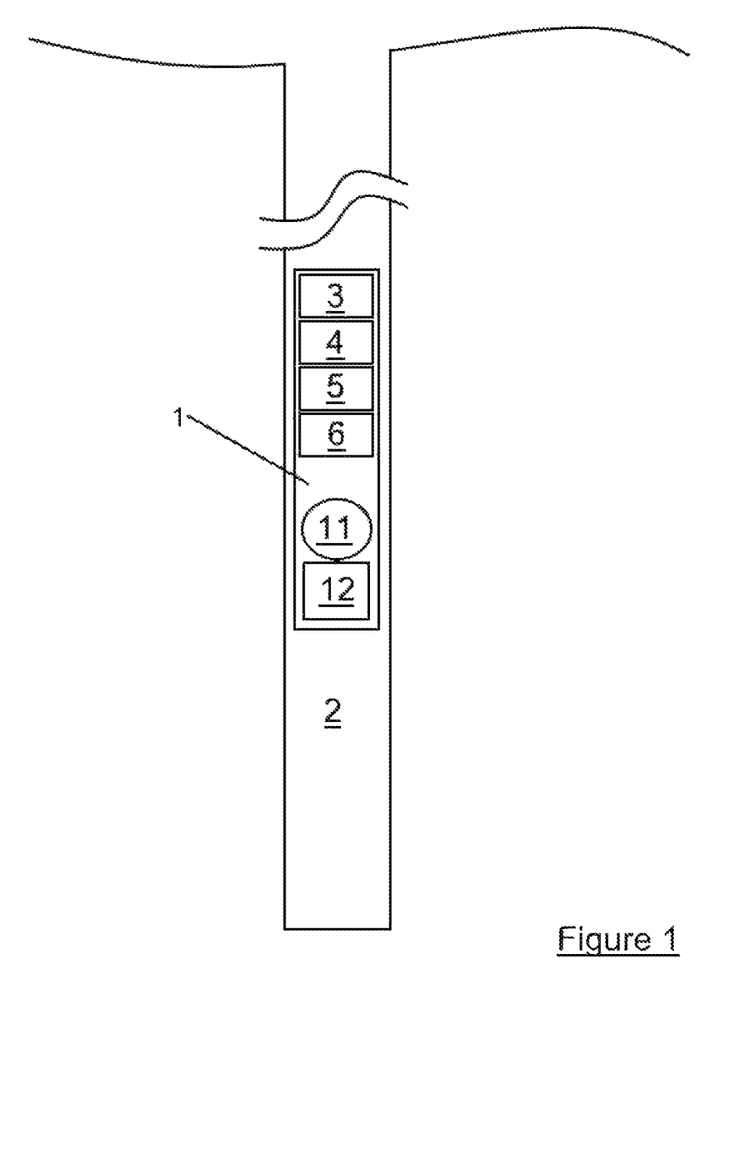
FIG. 1 is a simplified schematic view of a system of embodiments.

With reference to FIG. 1, some embodiments of the present invention include downhole equipment 1 configured to be lowered into a borehole 2, which may be used for the exploration/production of water or hydrocarbons, such as natural gas and/or oil. Equally, the borehole 2 may be used in geological surveying, for example.

The downhole equipment 1 may include a drillstring that includes a bottomhole assembly and drillpipe, for example. In some embodiments, the drillstring may be steerable—i.e. the drillstring can be steered off a straight longitudinal course to extend the borehole in a desired direction.

The downhole equipment 1 includes at least one motor or motor-generator 11 (which may be part of the bottom hole assembly or which may be part of another portion of the drill string). The motor or motor-generator 11 may be an induction or permanent magnet motor, for example, and in some embodiments may be a three-phase motor.

In some embodiments, a rotatable driveshaft of the motor or motor-generator 11 is coupled to a propeller 12 (which may be part of an impeller). The propeller 12 may be configured to be driven by the flow of a fluid (e.g. drilling fluid or "mud") through or around at least part of the downhole equipment 1. In addition or alternatively, in some embodiments, the propeller 12 may be configured to drive the flow of fluid through or around at least part of the downhole equipment 1. In some embodiments, the motor or motor-generator 11 may be configured to drive (or be driven by, as the case may be) some other element of the downhole equipment 1.

The downhole equipment 1 may include a power control circuit 3, which is configured to drive the motor or motor-generator 11, and/or to rectify electrical power generated by the motor or motor-generator 11.

Figure 2:
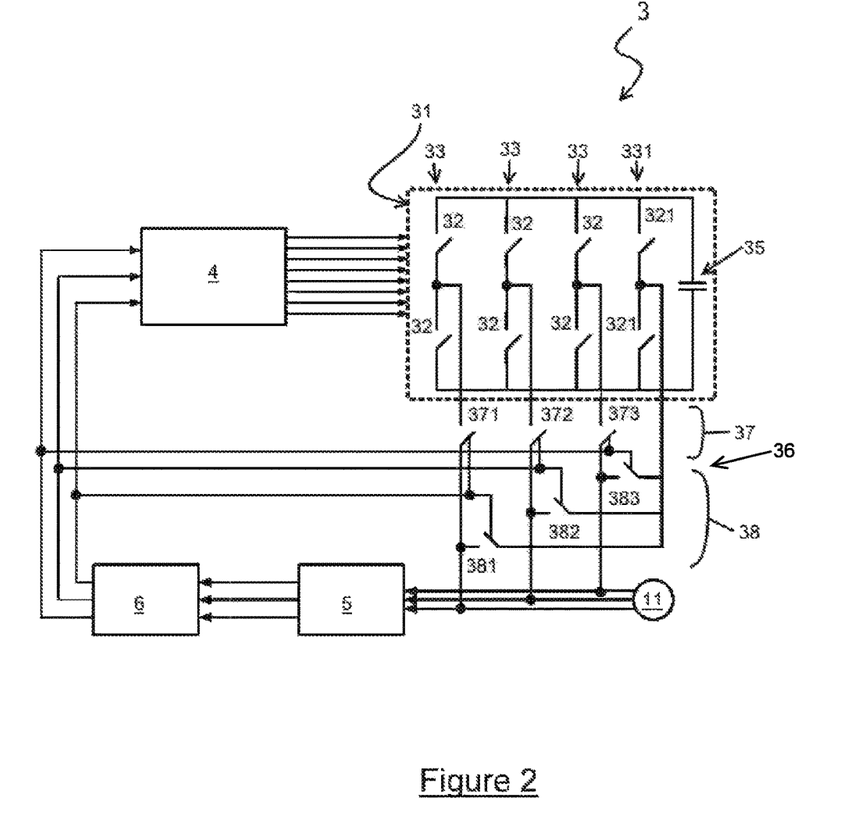
FIG. 2 is a simplified schematic view of an inverter or controlled rectifier system of embodiments.

With reference to FIG. 2, the power control circuit 3 may include an inverter 31 which, it will be appreciated, may also act as a controlled rectifier in some embodiments. The inverter 31 comprises a plurality of switch devices 32. The switch devices 32 are connected in one or more legs 33. In some embodiments, each leg 33 includes a pair of switch devices 32 connected in series, but in any event each leg 33 includes at least one switch device 32. In embodiments including a plurality of legs 33, each leg is connected in parallel with the others.

In embodiments in which a multi-phase motor or motor-generator 11 is provided (e.g. a three-phase motor or motor-generator 11), the motor or motor-generator 11 includes a set of windings for each phase. Each winding of the motor or motor-generator 11 is connected in selective electrical communication with a respective leg 33 between the pair of switch devices 32.

Figure 3:
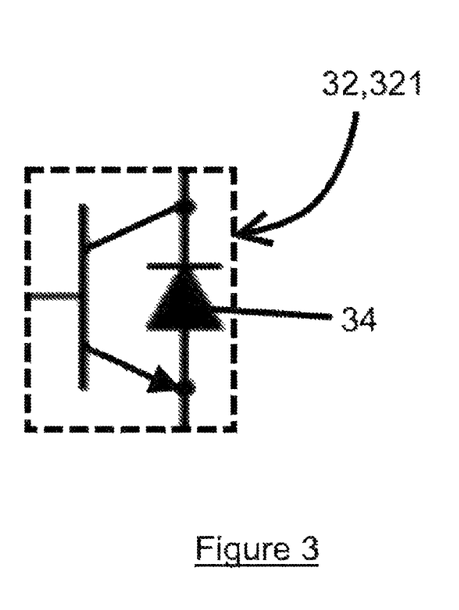
FIG. 3 is a schematic view of a switch device and protection device of some embodiments.

The switch devices 32 may each be transistor-based devices—such as insulated-gate bipolar transistors. Each switch device 32 may be connected in parallel with one or more protection devices 34 such as a freewheeling diode (see FIG. 3 for example).

The switch devices 32 are connected in electrical communication with a control system 4 that is configured to control the actuation of the switch devices 32 in accordance with a control scheme. The control scheme is such that, for example, the desired voltage is output from the power control circuit 4 and/or delivered to the motor or motor-generator 11. The control system 4 may, therefore, operate in a first mode in which the power control circuit 3 operates as an inverter or a controlled rectifier.

A capacitor 35 may be provided connected in parallel with the switch devices 32 (e.g. across an output of the power control circuit 3, to smooth the voltage at the output). In other words, the capacitor 35 is connected in parallel with the or each leg 33.

In embodiments, the switch devices 32 includes at least one set of spare switch devices 321, which form part of one or more spare legs 331. In some embodiments, a spare leg 331 includes a pair of spare switch devices 321. The pair of spare switch devices 321 may be connected in the same configuration as the pair of switch devices 32 of another of the legs 33 of the power control circuit 3. Accordingly, one or more of the windings of the motor or motor-generator 11 is connected in selective electrical communication with the spare leg 331 between the pair of spare switch devices 321.

A leg selection sub-system 36 is provided in electrical communication between the legs 33 of the power control circuit 3 and the motor or motor-generator 11, to provide the selective electrical communication between the legs 33,331 and the motor or motor-generator 11.

As such, the leg selection sub-system 36 may include a set of leg disconnect switches 37 and a set of spare leg connect switches 38. A leg disconnect switch 37 and a spare leg connect switch 38 may be provided for each phase of motor or motor-generator 11. Accordingly, in a three phase system, with a three phase motor or motor-generator 11, there may be three leg disconnect switches 371,372,373 and three spare leg connect switches 381,382,383.

Each leg disconnect switch 37 is connected in series between each leg 33 and the motor or motor-generator 11. Accordingly, if a one of the leg disconnect switches 37 is open, then that leg 33 is out of electrical communication with the associated winding of the motor or motor-generator 11 (i.e. that leg is inactive). Similarly, if that leg disconnect switch 37 is closed, then that leg 33 is in electrical communication with the associated winding of the motor or motor-generator 11 (i.e. that leg is active). In other words, each leg disconnect switch 37 is configured to determine selectively whether the leg 33 with which it is associated is in electrical communication with the motor or motor-generator 11 and hence operable to deliver or receive electrical power to or from the motor or motor-generator 11.

The spare leg 331 is selectively connected via the leg selection sub-system 36 to the motor or motor-generator 11. In particular, the leg selection sub-system 36 is configured to connect the spare leg 331 selectively in electrical communication with any one of the phase windings of the motor or motor-generator 11 or to disconnect the spare leg 331 from electrical communication with all of the phase windings of the motor or motor-generator 11. The spare leg 331 may be selectively connectable in electrical communication with one or more of the windings of the motor or motor-generator 11—e.g. to two or more of the windings—but only to a single winding at any one time. Accordingly, the spare leg 331 may be activated to take over the supply of electricity to a winding and deactivated or inactive in relation to others of the windings.

The spare leg connect switches 38 may each be connected in series with a respective winding of the motor or motor-generator 11.

Accordingly, a leg 33 may be disconnected from the motor or motor-generator 11 (i.e. deactivated or made inactive) and the functionality of that leg 33 may be taken over by the spare leg 331 which is connected to the motor or motor-generator 11 (i.e. the spare leg 331 is activated).

A fault detection sub-system 5 may be provided as part of the power control circuit 3 or another part of the downhole equipment 1 (e.g. as part of the motor or motor-generator 11).

The fault detection sub-system 5 is configured to identify a fault in the operation of one or more of the legs 33 (e.g. the failure of one or more of the switch devices 32). The fault detection sub-system 5 may be configured, for example, to detect an unbalanced current or voltage associated with a particular leg 33 with respect to one or more other legs 33. In some embodiments, the fault detection sub-system 5 is configured to detect a current and/or over a predetermined level (i.e. a fault level) provided by one or more leg 33 to the motor or motor-generator 11.

In embodiments, the fault detection sub-system 5 is configured to detect a fault with one or more legs 33 and to identify the one or more legs 33 with a fault.

The fault detection sub-system 5 may, therefore, be connected in electrical communication with the motor or motor-generator 11 and, in particular, the or each winding of the motor or motor-generator 11 (i.e. the input(s)).

The fault detection sub-system 5 may also, therefore, include an output over which a signal may be output representative of a detected fault; this signal may include the identity of the leg 33 or legs 33 with the fault.

A leg selection control sub-system 6 may be provided as part of the power control circuit 3 or another part of the downhole equipment 1.

The leg selection control sub-system 6 is configured to receive the signal output by the fault detection sub-system 5 and may, therefore, be communicatively coupled to the fault detection sub-system 5.

The leg selection control sub-system 6 is further communicatively connected to the leg selection sub-system 36 and is configured to output control signal thereto in order to control the actuation of the or each leg disconnect switch 37 and the or each spare leg connect switch 38.

The leg selection control sub-system 6 may be configured to operate the or each leg disconnect switch 37 and the or each spare leg connect switch 38 in a predetermined set of relationships. Accordingly, in a first mode of operation, a fault-free mode, the leg selection control sub-system 6 may be configured to actuate and/or maintain the or each leg disconnect switch 37 in a closed configuration such that the or each leg 33 is connected in electrical communication with the motor or motor-generator 11.

In a three phase embodiment, there are three leg disconnect switches 37 which are, in the fault-free mode, all in the closed configuration.

If a fault is detected by the fault detection sub-system 5 and identified to the leg selection control sub-system 6, then the leg selection control sub-system 6 may enter a detected fault mode of operation. In the detected fault mode of operation, the leg selection control sub-system 6 operates to actuate one of the leg disconnect switches 37 from the closed configuration to the open configuration, such that the leg 33 associated with that leg disconnect switch 37 is disconnected from electrical communication with the motor or motor-generator 11. The leg selection control sub-system 6 may further be configured to actuate one of the spare leg connect switch 38 to connect the spare leg 331 in electrical communication with the motor or motor-generator 11. In a multi-phase system, the leg disconnect switch 37 and spare leg connect switch 38 which are both actuated are associated with the same phase (i.e. the same winding of the motor or motor-generator 11).

In other words, the leg selection control sub-system 6 may be configured to swap faulty leg 33 for the spare leg 331. In some such embodiments, the other leg disconnect switches 37 remain in the closed configuration (i.e. the or each others of the legs 33 remain in electrical communication with the motor or motor-generator 11).

In embodiments in which there is more than one spare leg 331, then the leg selection control sub-system 6 may be configured to swap a corresponding number of faulty legs 33 for respective spare legs 331.

In some embodiments, a first of the leg disconnect switches 371 is associated with a first of the spare leg connect switches 381, such that when the first leg disconnect switch 371 is closed, the first spare leg connect switch 381 is open, and vice versa. Accordingly, the first leg disconnect switch 371 and first spare leg connect switch 381 may be a pair of associated or even linked switches 371,381. The same may be the case for a second leg disconnect switch 372 and a second spare leg connect switch 382, along with a third leg disconnect switch 373 and a third spare leg connect switch 383.

The leg selection control sub-system 6 may be further communicatively connected to the control system 4. In some embodiments, the fault detection sub-system 5 is communicatively connected to the control system 4 (and configured to receive the output signal from the fault detection sub-system 5).

The leg selection control sub-system 6 and/or the fault detection sub-system 5 may be configured to cause the control system 4 to modify the control of the switch devices 31 and the spare switch devices 321 in view of a detected fault, in the detected fault mode of operation. For example, the control system 4 may discontinue actuation of the switch devices 32 in the leg 33 in which the fault was detected—e.g. leaving them in an open or closed configuration. The control system 4 may then control the operation of the spare switch devices 321 of the spare leg 331 so that the spare switch devices takeover the operation of the switch devices 32 of the leg 33 in which the fault was detected. The same may occur in relation to other spare legs 331, if provided—so that each spare leg 331 may take over the operation of a single other leg 33 with a fault.

Accordingly, the spare leg 331 is used as a backup to takeover the operation of a faulty leg 33. This can be achieved without having to access the switch devices 32 (e.g. to replace a switch device 32 in which a fault has developed).

Accordingly, such embodiments of the invention provide a fault tolerant inverter 31 and/or controlled rectifier.

In some embodiments, the configuration of the power control circuit 3 (e.g. of the inverter 31 or controlled rectifier) is such that the leg disconnect switch or switches 37 may not be needed.

Figure 4:
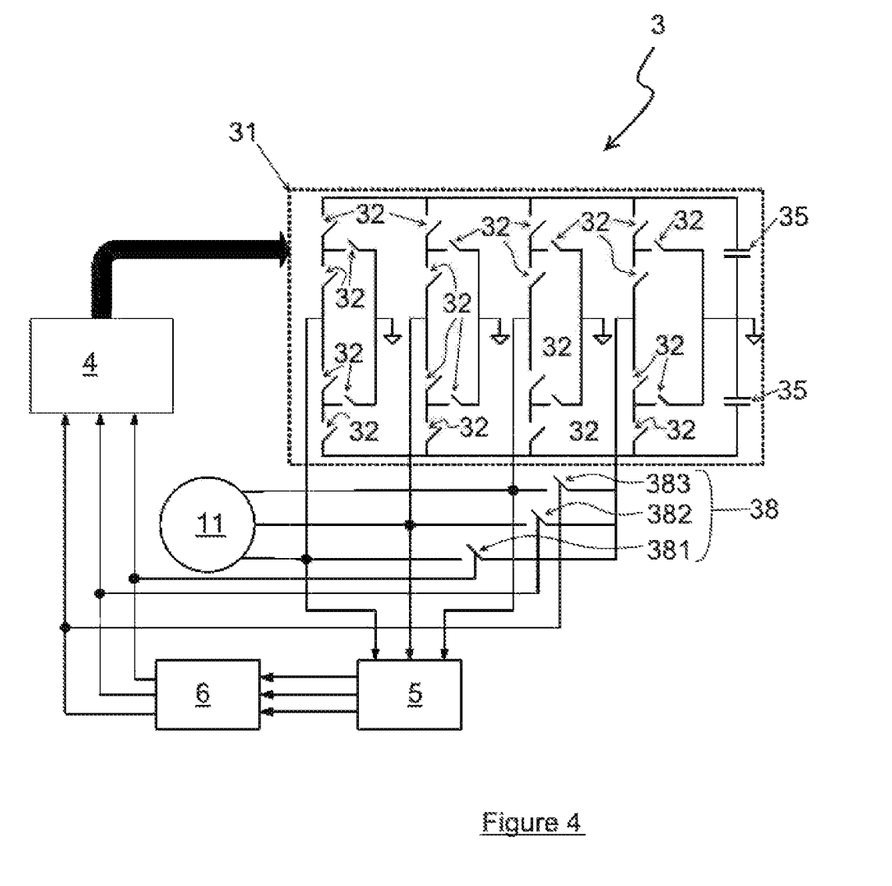
FIG. 4 is a simplified schematic view of an inverter or controlled rectifier system of embodiments.

For example, in FIG. 4, a three level power control circuit 3 is depicted (i.e. a three level inverter 31).

The embodiment of FIG. 4 is similar to that of FIG. 2. As can be seen one or more spare leg connect switches 38 are provided—one for each leg 33, of which there are three in this three phase example.

The fault detection sub-system 5 operates in much the same as in other embodiments. However, when a fault is detected, the leg selection control sub-system 6 controls the actuation of the spare leg connect switch 38 associated with the leg 33 in which the fault was detected, but it is the control system 4 which disconnects the faulting leg 33. In particular, because of the arrangement of switch devices 32 in each leg 33 of this multi-level configuration, the control system 4 can actuate all of the switch devices 32 in the faulty leg 33 to their open state or configuration. Irrespective of whether or not the faulty switch device 32 is in an open or short-circuit fault condition, this will effectively disconnect the leg 33 from the motor or motor-generator 11.

As will be appreciated, the same configuration may be used in other topologies of power control circuit 3, including inverters and/or controlled rectifiers 31 for providing more than three levels of voltage operation.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A fault tolerant inverter or controlled rectifier system comprising:
   a first leg including at least one switch device;
   a spare leg including at least one spare switch device;
   a spare leg connect switch associated with the spare leg and the first leg;
   a fault detection sub-system configured to detect a fault in the first leg and to output a signal on detection of a fault in the first leg; and
   a leg selection control sub-system configured to receive the signal output by the fault detection sub-system and to control operation of the spare leg connect switch in accordance with the output signal from the fault detection sub-system such that on detection of a fault the spare leg may be activated to take over the operation of the first leg.

2. A system according to claim 1, further comprising a leg disconnect switch associated with the first leg and configured to deactivate the first leg on detection of a fault.

3. A system according to claim 2, further comprising a control system configured to control the operation of the at least one switch device and the at least one spare switch device, wherein the control system is configured to control the at least one spare switch device to take over operation of the at least one switch device in the event of a fault.

4. A system according to claim 3, wherein the control system is configured to receive the signal output by the fault detection sub-system.

5. A system according to claim 3, wherein the control system is configured to receive a further signal output by the leg selection control sub-system in response to receipt of the signal from the fault detection sub-system.

6. A system according to claim 1, further comprising a control system configured to control the operation of the at least one switch device, wherein the control system is configured to deactivate the first leg on detection of a fault.

7. A system according to claim 6, wherein the first leg includes at least three switch devices.

8. A system according to claim 6, wherein the control system is configured to receive the signal output by the fault detection sub-system.

9. A system according to claim 6, wherein the control system is configured to receive a further signal output by the leg selection control sub-system in response to receipt of the signal from the fault detection sub-system.

10. A system according to claim 1, wherein the first leg is one of a plurality of legs, each leg including at least one switch device, the fault detection sub-system being further configured to detect a fault in any of the plurality legs and the signal output by the fault detection sub-system includes an indication of the leg in which the fault occurred, each of the plurality of legs is associated with a respective spare leg connect switch, and the leg selection control sub-system is configured to receive the signal output by the fault detection sub-system and to control the operation of the spare leg connect switch associated with the leg in which the fault was detected to activate the spare leg to take over the operation of the leg in which the fault was detected.

11. A system according to claim 1, wherein the system is a multilevel inverter or controlled rectifier system.

12. A drive or drive-generation system including:
   an inverter or controlled rectifier system according to claim 1; and
   a motor or motor-generator connected to the inverter or controller rectifier system.

13. A system according to claim 12, wherein the motor or motor-generator includes a three phase motor.

14. Downhole equipment including a fault tolerant inverter or controlled rectifier system comprising:
   a first leg including at least one switch device;
   a spare leg including at least one spare switch device;
   a spare leg connect switch associated with the spare leg and the first leg;
   a fault detection sub-system configured to detect a fault in the first leg and to output a signal on detection of a fault in the first leg; and
   a leg selection control sub-system configured to receive the signal output by the fault detection sub-system and to control the operation of the spare leg connect switch in accordance with the output signal output by the fault detection sub-system such that on detection of a fault the spare leg may be activated to take over the operation of the first leg.

15. The downhole equipment of claim 14, wherein the downhole equipment is configured to operate down a borehole.

* * * * *

UNITED STATES PATENT AND TRADEMARK OFFICE
CERTIFICATE OF CORRECTION

PATENT NO. : 10,355,581 B2
APPLICATION NO. : 15/762430
DATED : July 16, 2019
INVENTOR(S) : Mustafa Guven et al.

It is certified that error appears in the above-identified patent and that said Letters Patent is hereby corrected as shown below:

On the Title Page

(60) Related U.S. Application Data: Replace "Sep. 22, 2016" with --Sep. 22, 2015--

Signed and Sealed this
Twenty-first Day of February, 2023

Katherine Kelly Vidal
*Director of the United States Patent and Trademark Office*